Sept. 7, 1965          D. F. GREBY          3,205,029
ROLLER BEARING ASSEMBLY
Filed April 17, 1963          2 Sheets-Sheet 1
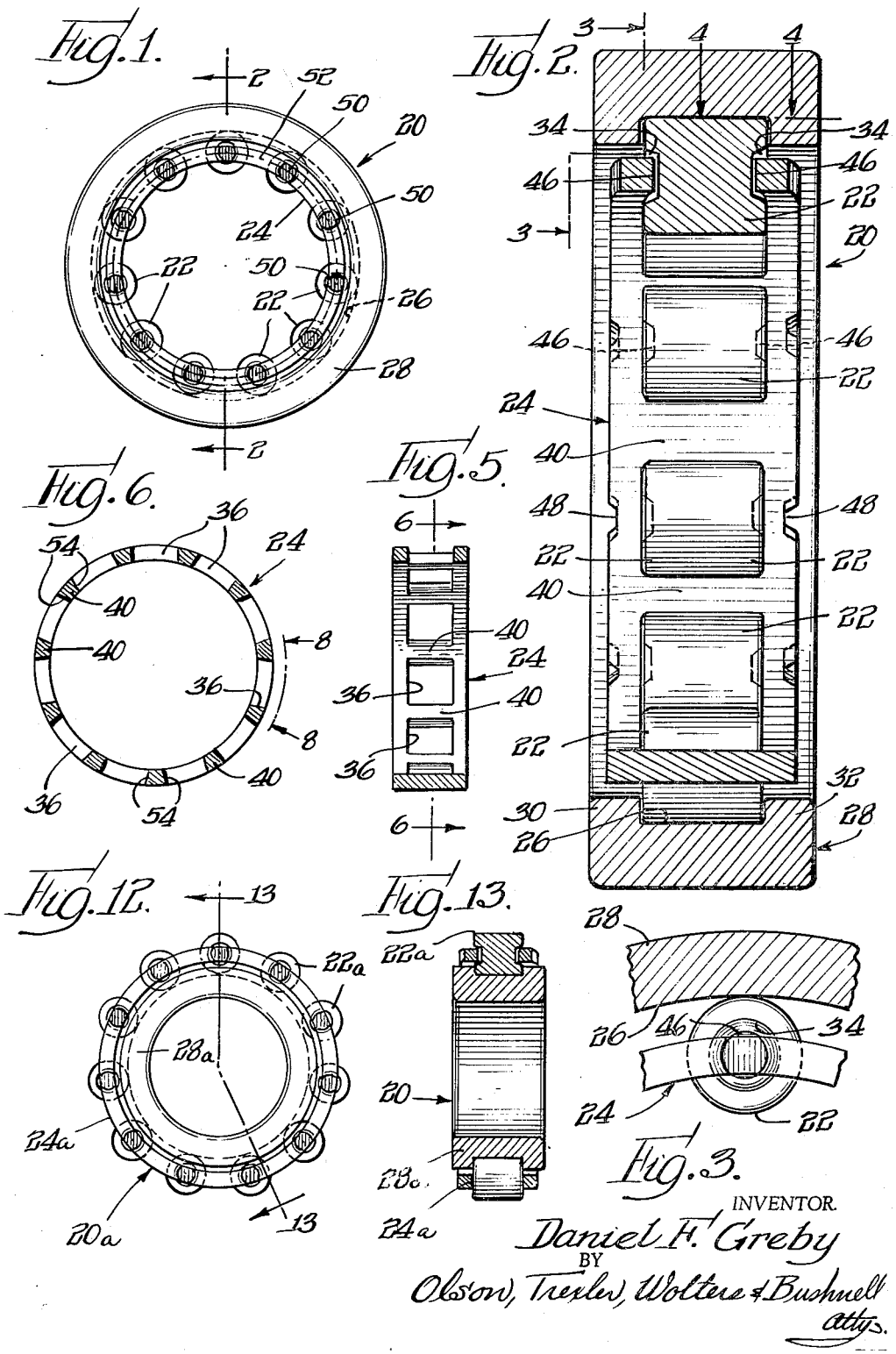
INVENTOR.
Daniel F. Greby
BY
Olson, Trexler, Wolters & Bushnell
attys.

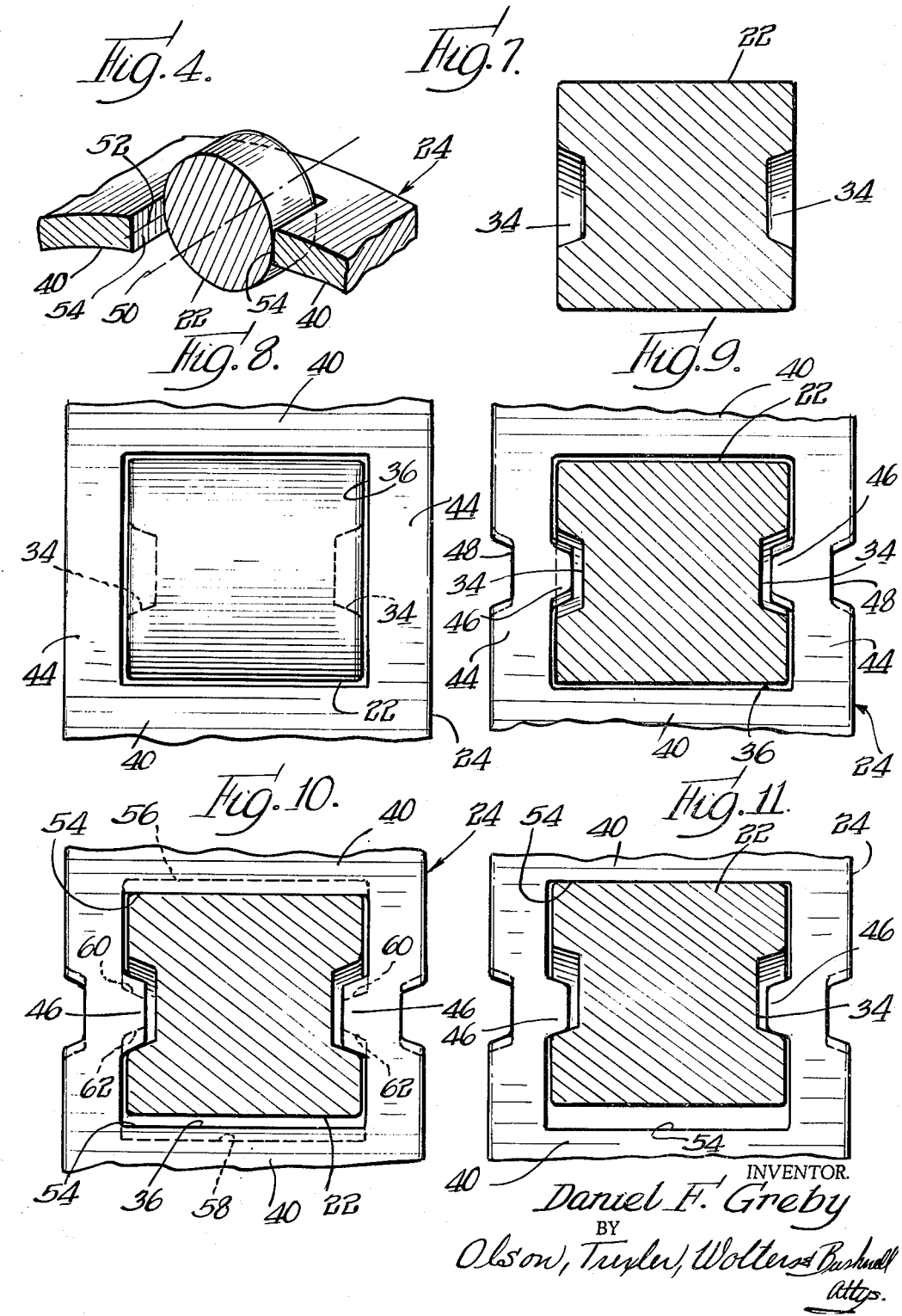

United States Patent Office 3,205,029
Patented Sept. 7, 1965

3,205,029
ROLLER BEARING ASSEMBLY
Daniel F. Greby, Chicago, Ill., assignor, by mesne assignments, to Textron Inc., Providence, R.I., a corporation of Rhode Island
Filed Apr. 17, 1963, Ser. No. 273,649
6 Claims. (Cl. 308—217)

This invention relates to roller bearings and more particularly to roller bearings of the type in which bearing rollers, each having indentations in opposite ends, are inserted in circumferentially spaced openings in an annular cage or spacer in which the rollers are retained by protuberances, formed by swaging marginal edge portions of the cage axially inward into the end indentations in the rollers, the rollers being maintained in circumferentially spaced relation to each other by the protuberances and by axial guide elements intervening between the rollers and constituting integral components of the cage.

One object of the invention is to provide a roller bearing of the character recited that has, in relation to prior bearings, a new and improved construction that provides for the bearing a greatly extended service life, which is particularly advantageous under adverse environmental conditions that tend to subject working parts of the bearing to abrasive wear.

Another object is to provide an improved roller bearing of the character recited in which improved guidance of the rollers is obtained by a construction that significantly minimizes the forces required to guide the rollers in their orbital path while at the same time maximizing the surface areas over which the roller guiding forces are distributed to the end that the stress and strain on the structure of the bearing is minimized and the performance capabilities of the bearing, including its service life, are increased.

Another object is to provide an improved roller bearing, in accordance with the preceding objects, having a construction which obviates undesirable distortion of the bearing cage as an incident to swaging opposite marginal edges of the cage to form protuberances that extend into opposite ends of the bearing rollers.

Other objects and advantages will become apparent from the following description of the exemplary forms of the invention illustrated in the drawings, in which:

FIGURE 1 is an end view of annular roller bearing structure forming one illustrated embodiment of the invention;

FIG. 2 is an axial sectional view on an enlarged scale of the bearing structure taken with reference to the line 2—2 of FIG. 1;

FIG. 3 is a fragmentary sectional view taken with reference to the irregular line 3—3 of FIG. 2;

FIG. 4 is a fragmentary perspective view taken generally with reference to the line 4—4 of FIG. 2 and showing one end of a typical bearing roller and coacting cage structure;

FIG. 5 is an axial sectional view showing the undeformed cage element of the bearing structure before the bearing rollers are assembled with the cage element;

FIG. 6 is a sectional view of the undeformed cage element taken with reference to the line 6—6 of FIG. 5;

FIG. 7 is an axial sectional view on a much enlarged scale of a typical bearing roller;

FIG. 8 is a fragmentary side view of the undistorted cage element on a much enlarged scale taken with reference to the line 8—8 of FIG. 6 but showing a bearing roller in place before the cage element is swaged to hold the roller against dislodgment;

FIG. 9 is a view similar to FIG. 8 but showing the bearing roller in section and illustrating the adjacent portions of the cage element after swaging to hold the roller in place;

FIG. 10 is a view similar to FIG. 9 but showing the cage element shifted into guiding engagement with the coacting roller and illustrated in phantom lines extensive zones of cage structure which is available for absorbing wear without deleterious effect on the functional capabilities of the bearing.

FIG. 11 is a view similar to FIG. 10 but illustrating the positional relationship of a typical roller to the cage element after substantial wear of the cage element has occurred;

FIG. 12 is an end view of a modified embodiment of the invention which incorporates an inner race element U-shaped in tranverse section whereas the bearing of FIG. 1 has an outer race element U-shaped and in transverse section; and FIG. 13 is an axial sectional view of the bearing of FIG. 12 taken generally along the line 13—13 of FIG. 12.

Referring to the drawing in greater detail, the roller bearing 20 illustrated in FIGS. 1 and 2 comprises an annular series of bearing rollers 22 which are held in circumferentially spaced relation to each other by a single, unitary cage element or cage 24.

In the bearing 20, all of the rollers 22 are disposed in rolling engagement with an outer race 26 defined by an outer race element 28 of integral construction, which is U-shaped in axial cross-section, FIG. 2. Thus, as shown, the outer race element 28 includes as integral portions thereof two lips or shoulder elements 30, 32, which extend radially inwardly into radially overlapping relation to opposite ends of each bearing roller 22.

As will presently appear, the bearing 20 is so constructed that the permanent assembling together of the rollers 22, integral cage 24 and race element 28 is made easy and efficient even though the unitary race element 28 is U-shaped in axial section as described to embrace opposite ends of each roller 22.

As is shown in the enlarged axial sectional view of a typical roller in FIG. 7, opposite ends of each roller are depressed to form central indentations 34 concentric with the axis of the roller. The indentations 34 are formed in opposite ends of each roller as an incident to manufacture of the roller in a conventional manner.

By way of explanation, it may be noted that before grinding, each roller 22 is formed in die means which produce the indentations 34 in opposite ends of the roller as an aid to providing for the roller a diameter which is uniform along its length. Hence, production of the indentations 34 in oppoiste ends of each roller 22 does not, as such, add to the cost of manufacturing the bearing rollers.

The cage element or member 24 is formed as an endless hollow cylinder which is relatively thick in relation to the diameter of the individual rollers 22. To provide the exceptional wearability which the cage member 24 is capable of providing, the cage member should have a thickness which is on the order of one-third of the diameter of an individual roller 22.

The relatively thick endless cage member 24 is apertured to define a series of circumferentially spaced openings 36 corresponding to the respective rollers 22 and having individually a rectilinear shape as viewed in a radial direction, such as from the line 8—8 of FIG. 6. Except for the spaces created by the openings 36, the cage member 24 is circular as viewed in transverse section.

Each opening 36 has a length along the axis of the bearing which is slightly greater than the axial length of a typical roller 22 to provide running clearance for the roller. The width of each opening 36 in a circumferential direction with respect to the cage member 24 is slightly larger than the diameter of a typical roller 22, again for providing running clearance around the roller. Thus, as shown in the drawings, FIGS. 6 and 8, the width of each opening 36 is uniform throughout the radial depth or extent of the opening.

As illustrated in the drawings, the roller openings 36 in the cage member 24 are spaced from each other by intervening roller guide elements or guide bars 40 which form integral parts of the cage member 24. Each individual guide element 40 is straight along the entire extent of the openings 36 on opposite sides of the guide element. Moreover the guide elements or bars 40 are massive by virture of the extensive radial thickness of the guide elements 40 and the substantially equally extensive circumferential width of each guide element.

To assemble the bearing 20, the outer race element 28 and the cage element 24 are temporarily supported in concentric relation to each other and the rollers 22 are placed in the cage openings 36 and supported in engagement with the race 26 by temporary support means of any suitable character. The relationship of the cage element 24 to a typical roller 22 temporarily supported in a cage opening 36 is most clearly illustrated in FIG. 8. It will be observed that the two spacer elements or roller guide bars 40 located on opposite sides of a typical roller 22 are connected together by two connecting or bridging segments 44 of the cage element which extend across opposite ends of the bearing roller.

With the parts thus supported temporarily in assembled relation to each other, the central portion of each connecting or bridging segment 44 which spans the identation 34 in the adjacent end of the corresponding roller 22 is swaged axially inward with respect to the corresponding roller 22 to form a cage guiding protuberance 46 which projects axially with respect to the adjacent roller 22 inwardly into the adjacent roller indentation 34. The swaging of the central portions of the connecting elements 44 which bridge the indentations 34 is effected by a suitable swaging die or tool (not shown), that can be readily provided by those skilled in the art.

As previously mentioned, the positional relationship of a pair of undeformed connecting elements 44 to an adjacent roller 22 is illustrated in FIG. 8. The positional relationship of the roller to the same connecting elements 44 after the connecting elements have been swaged to form the inwardly projecting protuberances 46 which extend into the indentations 34 is illustrated in FIG. 9.

It should be noted that the swaging operation which forms the cage guiding protuberances 46 also shapes the axial outer edges of the connecting or bridging elements 44 to leave indentations 48 corresponding to the guide protuberances 46.

It is fitting to point out that the action of the swaging tool which deforms in an axial direction the central portion of each bridging element 44 to produce in the bridging element the indentation 48 and the corresponding guiding protuberance 46 deflects the bridging element 44 axially inward so that it rests against the adjacent end of the corresponding roller 22, which acts as a female die to aid in shaping the portion of the bridging element 44 which spans the roller indentation 34. In acting as a female die in the shaping of the adjacent bridging element 44 of the cage 24, each end of each roller 22 supports portions of the bridging element 44 located on opposite sides of that portion of the bridging element 44 which spans the indentation 34. Thus, the roller cooperates to effect a drawing of the central portion of the bridging element 44, which spans the corresponding roller indentation 34, to form the coacting protuberance 46.

Upon release of the cage 24 after drawing of the central portions of the bridging elements 44 and form the guiding protuberances 46 in the manner described, the cage structure defining each opening 36 springs back from the corresponding roller 22 sufficiently to provide running clearance between the cage and the roller, thus leaving the roller free to turn but permanently assembled with the cage.

When the bearing 20 is placed into service, each roller 22 may shift in its cage opening 36 until it engages one of the adjacent spacer bars 40 as illustrated in FIG. 10.

It should be mentioned that the clearances initially provided between each roller 22 and the cage member 24 are exaggerated somewhat in the drawings for clearness in illustration. Also, the dimensional degree to which the guide protuberances 46 project into the roller indentations 34 is exaggerated for clearness in illustration.

The projection of the cage guiding protuberances 46 into the roller indentations 34 continuously guide the cage member 24 in relation to the rollers 22 so that the guide bars or roller guide segments 40 of the cage member 24 are positioned to slidably engage the respective rollers 22 in positions which are generally symmetrical with respect to the pitch circle of the rollers 22. The "pitch circle" of the rollers 22 is a circle extending through the axes of all the rollers 22.

For the purpose of visualizing the relationship of the parts, the axes of the rollers 22 are represented in FIGS. 1 and 4 by points and a line identified by the number 50. The "pitch circle" which may be more meanfully visualized as an imaginary surface extending through the axes 50 of the rollers 52 is represented in FIG. 1 by the phantom circular line 52. Thus, as indicated in FIG. 2, the pitch circle or imaginary surface 52 extending through the axes 50 of the rollers 22 has a central radial location with respect to the cage member 24. As a consequence, the roller guide bars 40 each has a radial extent beyond the pitch line or surface 52 which is approximately equal to the radial extent of each bar inwardly of the same pitch line or surface 52. Put another way, each roller 22 extends substantially equal distances in opposite directions beyond the two adjacent guide bars 40.

As indicated in FIGS. 4 and 6, each roller guide bar 40 defines a rectangular guide surface 54 confronting each of the adjacent rollers 22 to slidably engage the adjacent roller 22. The intersection of the roller pitch surface 52 with a typical roller guide surface 54 is indicated by the broken line 52 in FIG. 4, wherein the generally symmetrical relationship of each roller guide surface 54 radially with respect to the roller pitch surface 52 is best illustrated. This makes for most efficient guiding of the rollers.

Because of the relatively large radial dimension of each roller guide bar 40 in relation to the diameter of each roller 22, each roller engaging surface 54 has a radial width which is rather extensive in relation to the diameter of the roller, the width of each surface 52 being preferably equal to approximately one-third of the diameter of the coacting roller. When the bearing is new, the two roller engaging surfaces 54 bounding opposite axial sides of each opening 36 are, as shown in the drawings, FIGS. 6 and 8, parallel to each other.

Because of the extensive radial width of the roller contact surfaces 54 on the roller guide bars 40 there is provided immediately behind each surface 54 a massive volume of structural material of the coacting roller guide bar 40. As a consequence of the extensiveness of the area of each guide surface 54, each surface 54 has a very high resistance to wear by abrasion by the relatively hard roller against the surface 54. This resistance of the surfaces 54 to wear by abrasion is of particular significance in the event that abrasive materials gain entrance into the bearing where they may come in contact with the surfaces 54.

Exceptional serviceability of the bearing is provided not only by the resistance of the surfaces 54 to wear, because of the extensive area of each surface 54, but also because of the capability of the cage member 24 to absorb an extensive receding of each wear surface 54 without failure to properly retain the rollers in spaced relation to each other even without the aid of coacting bearing races.

The massive amount of roller guide bar material which backs up each guide surface 54 and is made available for erosion by wear without causing a functional failure of the cage member 24 is indicated generally by the phantom lines 56, 58, appearing in FIG. 10.

The capability of the cage guiding protuberances 46 to absorb wear without functional failure is equally extensive. The relatively large portions of a typical protuberance 46 which can be worn away by the relatively hard, coacting roller 22 without causing a functional failure are indicated generally by the lines 60, 62, in FIG. 10.

FIGURE 11 illustrates the relationship of a typical roller 22 to the coacting cage structure after the cage structure has been subjected to extensive wear reducing the size of the cage guiding protuberances 46 and increasing the circumferential spacing from each other of the axial guide surface 54 opposing the roller 22. Nevertheless, because of the relationship of the parts, the extensiveness of the guide surfaces 54, and the massive size of the cage structure which is subject to wear, the wearability of the cage 24 and the serviceability of the bearing are maintained.

In the event a worn bearing, as illustrated in FIG. 11, is temporarily removed from service so that the rollers 22 are no longer engaged by an inner and outer race, the guide protuberances 46 continue to project effectively into the roller indentations 34 to prevent the rollers from dropping out of their desired assembled relation to the cage 24.

Component elements of the modified embodiment of the invention, illustrated in FIGS. 12 and 13, which are similar to those of the bearing illustrated in FIGS. 1 and 2 are identified with the same reference number with the addition of the suffix "a."

The modified bearing 20a differs from the bearing 20 essentially in that the U-shaped bearing race member 28a of the bearing 20a is encircled by the annular series of bearing rollers 22a and constitutes an inner race element. Since the inner race member 28a is U-shaped to radially overlap opposite ends of each bearing roller 22a, the rollers 22a are moved into their assembled positions in relation to the cage element 24a and the inner race member 28a by movement of the rollers 22a radially inward with respect to the cage element 24a, the rollers 22a entering the openings 36 through the radially outward sides of the openings. As evident from the description and as shown most clearly in FIGS. 6 and 10, the width of each opening 36 in the cage or spacer 24 of the bearing 20 first described does not contract or narrow in a radially outward direction. Consequently the cage 24 can be used without modification either as the cage 24a in the bearing 20a, in which the bearing rollers are assembled with the cage 24a by radially inward movement of the rollers with respect to the cage, or as the cage 24 in the bearing 20, in which the bearing rollers 22 are assembled with the cage 24 by radially outward movement of the bearing rollers 22 with respect to the cage.

It will be appreciated that the invention is not necessarily limited to use of the particular structures illustrated, but includes variants which fall within the spirit and scope of the invention as defined by the claims.

The invention is claimed as follows:

1. A roller bearing assembly comprising, an annular series of bearing rollers, each roller defining in each end thereof an indentation concentric with the axis of the roller; a unitary annular cage having the overall shape, as viewed in transverse section, of a hollow circular cylinder; said cage defining an annular series of roller apertures therein spaced apart circumferentially by an annular series of roller guide bars intervening between successive roller apertures and constituting integral components of the cage, said guide bars extending individually between the two marginal edges of the cage on the two axial ends of the cage, each roller guide bar being essentially straight axially throughout the axial extent of the two roller apertures on opposite sides of the guide bar, said rollers being positioned in said respective apertures so that the axis of each roller has a radial spacing from the axis of the cage which is substantially equal to the radial spacing from the axis of the cage of the radial center of the guide bar on each side of the roller; each of said apertures having a minimum width, measured circumferentially with respect to said cage, that slightly exceeds the corresponding diameter of the corresponding roller; each of said guide bars having a radial thickness which is of the order of one-third of the diameter of each individual rollers, the adjacent ends of each two adjacent guide bars being integral with a bridging element formed by the adjacent portion of the adjacent marginal edge of the cage which extends across the adjacent end of the roller intervening between the two adjacent guide bars, the medial portion of each bridging element of the cage being swaged axially inward with respect to the adjacent roller to form a protuberance which projects inwardly into the indentation in the adjacent end of the roller, the two bridging elements at opposite ends of each roller having close running fits with the adjacent ends of the roller, the cumulative axial clearance between the two ends of each roller and the two adjacent bridging elements being materially less than the maximum axial extent of each protuberance into the indentation in the adjacent end of the corresponding roller, each of said protuberances being radially flush on both the radially inward and radially outward sides thereof respectively with the radially innermost and the radially outermost extremities of the two adjacent guide bars; and each of said protuberances having a width, measured circumferentially with respect to said cage, that varies in a radial direction relative to the axis of the bearing and that has a maximum value at a position that is centrally located radially with respect to the protuberance and that is centrally located radially with respect to adjacent portions of the two adjacent guide bars; said rollers and said cage member being maintained in proper relation to each other by engagement with the rollers of said guide bars and with said bridging element protuberances projecting into said roller indentations.

2. A roller bearing assembly comprising, an annular series of bearing rollers, each roller defining in each end thereof an indentation concentric with the axis of the roller; a one-piece annular cage having an overall shape, as viewed in transverse section, that is circular on both its radially inner side and its radially outer side; said cage defining an annular series of roller apertures therein spaced apart circumferentially by an annular series of roller guide bars intervening between successive roller apertures and constituting integral components of the cage, said guide bars extending individually between the two marginal edges of the cage on the two axial ends of the cage, each roller guide bar being essentially straight axially throughout the axial extent thereof, said rollers being positioned in said respective apertures so that the axis of each roller has a radial spacing from the axis of the cage which is substantially equal to the radial spacing from the axis of the cage of the corresponding radial center of the guide bar on each side of the roller; each of said apertures having a minimum width, measured circumferentially with respect to said cage, that slightly exceeds the corresponding diameter of the corresponding roller; the adjacent ends of each two adjacent guide bars being integral with a bridging element formed by the adjacent portion of the adjacent marginal edge of the cage which extends across the adjacent end of the roller intervening between the two adjacent guide bars, the medial portion of each bridging element of the cage being swaged axially inward with respect to the adjacent roller to form a protuberance which projects inwardly into the indentation in the adjacent end of the roller; said cage having a thickness, measured radially with respect to the axis of the cage, that is uniform throughout the extent of the cage; the two bridging elements at opposite ends of each roller having close running fits with the adjacent ends of the roller, the cumulative axial clearance between the two ends of each roller and the two adjacent bridging elements being materially less than the maximum axial extent of each protuberance into the indentation in the adjacent end of the corresponding roller; the marginal edge of said cage at each end of the cage being bounded on the radially inward and radially outward sides thereof by surfaces which, respectively, are flush with and have the same curvature as the surfaces on the radially inward and radially outward sides of the adjacent ends of said guide bars; each of said protuberances being radially flush on both the radially inward and radially outward sides thereof respectively with the corresponding radially innermost and the corresponding radially outermost extremities of the two adjacent guide bars; and each of said protuberances having a width, measured circumferentially with respect to said cage, that varies in a radial direction relative to the axis of the cage and that has a maximum value at a position that is centrally located radially with respect to the protuberance and that is centrally located radially with respect to adjacent portions of the two adjacent guide bars; said rollers and said cage member being maintained in proper relation to each other by engagement with the rollers of said guide bars and with said bridging element protuberances projecting into said roller indentations.

3. A roller bearing assembly comprising, an annular series of bearing rollers, each roller defining in each end thereof an indentation concentric with the axis of the roller; a one-piece annular cage having the overall shape, as viewed in transverse section, of a hollow circular cylinder; said cage defining an annular series of roller apertures therein spaced apart circumferentially by an annular series of roller guide bars intervening between successive roller apertures and constituting integral components of the cage, said guide bars extending individually between the two marginal edges of the cage on the two axial ends of the cage, each roller guide bar being essentially straight axially throughout the axial extent thereof, an annular race element coaxial with said cage and defining a circular race surface disposed in rolling contact with all of said rollers, means on said race element defining two annular shoulders extending radially from opposite sides of said race surface into radially overlapping relation to opposite ends of all of said rollers, said cage being dimensioned diametrically so that the radial spacing of the radial centers of said guide bars from the axis of said cage differs from the radius of said race surface by a dimension equal to the radius of each roller, each of said apertures having a minimum width, measured circumferentially with respect to said cage, that slightly exceeds the diameter of the corresponding roller; the adjacent ends of each two adjacent guide bars being integral with a bridging element formed by the adjacent portion of the adjacent marginal edge of the cage which extends across the adjacent end of the roller intervening between the two adjacent guide bars, the medial portion of each bridging element of the cage being swaged axially inward with respect to the adjacent roller to form a protuberance which projects inwardly into the indentation in the adjacent end of the roller, the two bridging elements at opposite ends of each roller having close running fits with the adjacent ends of the roller, the cumulative axial clearance between the two ends of each roller and the two adjacent bridging elements being materially less than the maximum axial extent of each proturberance into the indentation in the adjacent end of the corresponding roller, each of said protuberances being radially flush on both the radially inward and radially outward sides thereof respectively with the radially innermost and the radially outermost extremities of the two adjacent guide bars; and each of said protuberances having a width, measured circumferentially with respect to said cage, that varies in a radial direction relative to the axis of the bearing and that has a maximum value at a position that is centrally located radially with respect to the protuberance and has a radial spacing from the axis of the cage that differs from the radius of said race surface by a dimension equal to the radius of each roller.

4. A roller bearing assembly comprising, an annular series of bearing rollers, each roller defining in each end thereof an indentation concentric with the axis of the roller; a one-piece annular cage having an overall shape, as viewed in transverse section, that is circular on both its radially inner side and its radially outer side; said cage defining an annular series of roller apertures therein spaced apart circumferentially by an annular series of roller guide bars intervening between successive roller apertures and constituting integral components of the cage, said guide bars extending individually between the two marginal edges of the cage on the two axial ends of the cage, each roller guide bar being essentially straight axially throughout the axial extent thereof, said rollers being positioned in said respective apertures so that the axis of each roller has a radial spacing from the axis of the cage which is substantially equal to the radial spacing from the axis of the cage of the corresponding radial center of the guide bar on each side of the roller; each of said apertures having a minimum width, measured circumferentially with respect to said cage, that slightly exceeds the corresponding diameter of the corresponding roller, the adjacent ends of each two adjacent guide bars being integral with a bridging element formed by the adjacent portion of the adjacent marginal edge of the cage which extends across the adjacent end of the roller intervening between the two adjacent guide bars, the medial portion of each bridging element of the cage being swaged axially inward with respect to the adjacent roller to form a protuberatnce which projects inwardly into the indentation in the adjacent end of the roller; the two bridging elements at opposite ends of each roller having close running fits with the adjacent ends of the roller, the cumplative axial clearance between the two ends of each roller and the two adjacent bridging elements being materially less than the maximum axial extent of each protuberance into the indentation in the adjacent end of the corresponding roller; each of said protuberances being radially flush on both the radially inward and radially outward sides thereof respectively with the corresponding radially innermost and the corresponding radially outermost extremities of the two adjacent guide bars; and each of said protuberances having a width, measured circumferentially with respect to said cage, that varies in a radial direction relative to the axis of the cage and that has a maximum value at a position that is centrally located radially with respect to the protuberance and that is centrally located radially with respect to adjacent portions of the two adjacent guide bars; said rollers and said cage member being maintained in proper relation to each other by engagement of the rollers with said guide bars and with said bridging element protuberances projecting into said roller indentations.

5. A roller bearing assembly comprising, an annular series of bearing rollers, each roller defining in each end thereof an indentation concentric with the axis of the roller; a one-piece annular cage having an overall shape, as viewed in transverse section, that is circular on both its radially inner side and its radially outer side, said cage defining an anular series of roller apertures therein spaced apart circumferentially by an annular series of roller guide bars intervening between successive roller apertures and constituting integral components of the cage, said guide bars extending individually between the two marginal edges of the cage on the two axial ends of the cage, each roller guide bar being essentially straight axially throughout the axial extent thereof, an annular race element coaxial with said cage and defining a circular race surface disposed in rolling contact with all of said rollers on the radially inward side of the rollers, means on said race element defining two annular shoulders extending radially outward from opposite sides of said race surface into radially overlapping relation to opposite ends of all of said rollers; each of said apertures having a minimum width, measured circumferentially with respect to said cage, that slightly exceeds the corresponding diameter of the corresponding roller; the adjacent ends of each two adjacent guide bars being integral with a bridging element formed by the adjacent portion of the adjacent marginal edge of the cage which extends across the adjacent end of the roller intervening between the two adjacent guide bars, the medial portion of each bridging element of the cage being swaged axially inward with respect to the adjacent roller to form a protuberance which projects inwardly into the indentation in the adjacent end of the roller; said cage having a thickness, measured radially with respect to the axis of the cage, that is uniform throughout the extent of the cage; the two bridging elements at opposite ends of each roller having close running fits with the adjacent ends of the roller, the cumulative axial clearance between the two ends of each roller and the two adjacent bridging elements being materially less than the maximum axial extent of each protuberance into the indentation in the adjacent end of the corresponding roller; the marginal edge of said cage at each end of the cage being bounded on the radially inward and radially outward sides thereof by surfaces which, respectively, are flush with and have the same curvature as the surfaces on the radially inward and radially outward sides of the adjacent ends of said guide bars; each of said protuberances being radially flush on both the radially inward and radially outward sides thereof respectively with the radially innermost and the radially outermost extremities of the two adjacent guide bars; and said cage being dimensioned diametrically so that the radial centers of said protuberances and the radial centers of said guide bars have spacings from said race surface that are equal to the radii of adjacent portions of adjacent rollers.

6. A roller bearing assembly comprising, an annular series of bearing rollers, each roller defining in each end thereof an indentation concentric with the axis of the roller; a one-piece annular cage having an overall shape, as viewed in transverse section, that is circular on both it radially inner side and its radially outer side; said cage defining an annular series of roller apertures therein spaced apart circumferentially by an annular series of roller guide bars intervening between successive roller apertures and constituting integral components of the cage, said guide bars extending individually between the two marginal edges of the cage on the two axial ends of the cage, each roller guide bar being essentially straight axially throughout the axial extent thereof, an annular race element coaxial with said cage and defining a circular race surface disposed in rolling contact with all of said rollers on the radially outward sides thereof, means on said race element defining two annular shoulders extending radially inward from opposite sides of said race surface into radially overlapping relation to opposite ends of all of said rollers, each of said apertures having a minimum width, measured circumferentially with respect to said cage, that slightly exceeds the diameter of the corresponding roller; the adjacent ends of each two adjacent guide bars being integral with a bridging element formed by the adjacent portion of the adjacent marginal edge of the cage which extends across the adjacent end of the roller intervening between the two adjacent guide bars, the medial portion of each bridging element of the cage being swaged axially inward with respect to the adjacent roller to form a protuberance which projects inwardly into the indentation in the adjacent end of the roller, the two bridging elements at opposite ends of each roller having close running fits with the adjacent ends of the roller, the cumulative axial clearance between the two ends of each roller and the two adjacent bridging elements being materially less than the maximum axial extent of each protuberance into the indentation in the adjacent end of the corresponding roller, each of said protuberances being radially flush on both the radially inward and radially outward sides thereof respectively with the radially innermost and the radially outermost extremities of the two adjacent guide bars; and said cage being dimensioned diametrically so that the spacings of the radial centers of said protuberances and of the radial centers of said guide bars from said race surface are equal to the radii of adjacent portions of the adjacent rollers.

References Cited by the Examiner

UNITED STATES PATENTS

| | | | |
|---|---|---|---|
| 1,250,595 | 12/17 | Knoth | 308—217 |
| 1,320,096 | 10/19 | Rouanet. | |
| 1,402,071 | 1/22 | Huther. | |
| 1,565,662 | 12/25 | Lott | 308—217 |
| 1,922,805 | 8/33 | Heim | 308—217 |
| 3,028,658 | 4/62 | Ortegren | 308—212 XR |

ROBERT C. RIORDON, *Primary Examiner.*